(12) United States Patent  (10) Patent No.: US 8,607,022 B2
Balkan et al.  (45) Date of Patent: Dec. 10, 2013

(54) PROCESSING QUALITY-OF-SERVICE (QOS) INFORMATION OF MEMORY TRANSACTIONS

(75) Inventors: Deniz Balkan, Santa Clara, CA (US); Gurjeet S. Saund, Saratoga, CA (US); Vijay Gupta, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 591 days.

(21) Appl. No.: 12/971,902

(22) Filed: Dec. 17, 2010

(65) Prior Publication Data

US 2012/0159088 A1  Jun. 21, 2012

(51) Int. Cl.
*G06F 12/00*  (2006.01)

(52) U.S. Cl.
USPC ............... 711/200; 711/5; 711/147; 711/154; 711/170; 711/220

(58) Field of Classification Search
None
See application file for complete search history.

(56) References Cited

U.S. PATENT DOCUMENTS

| 7,562,213 B1 * | 7/2009 | Timms ........................ 713/160 |
| 2003/0093633 A1 * | 5/2003 | Thiesfeld et al. ............ 711/154 |
| 2006/0064494 A1 * | 3/2006 | Fukui ........................... 709/227 |

OTHER PUBLICATIONS

ARM White Paper, "The ARM Cortex-A9 Processors," Document Revision 2.0, Sep. 2009, 11 pages.
ARM, "Cortex-A9 MPCore, Revision: r2p2, Technical Manual," Copyright 2008-2010, 168 pages.

* cited by examiner

*Primary Examiner* — Matthew Bradley
*Assistant Examiner* — Alan Otto
(74) *Attorney, Agent, or Firm* — Lawrence J. Merkel; Meyertons, Hood, Kivlin, Kowert & Goetzel, P.C.

(57) ABSTRACT

Systems and methods for processing quality-of-service (QoS) information of memory transactions are described. In an embodiment, a method comprises receiving identification information and quality-of-service information corresponding to a first or original memory transaction transmitted from a hardware subsystem to a memory, receiving a given memory transaction from a processor complex that does not support quality-of-service encoding, determining whether the given memory transaction matches the original memory transaction, and appending the stored quality-of-service information to the given memory transaction in response to the given memory transaction matching the original memory transaction. In some embodiments, a system may be implemented as a system-on-a-chip (SoC). Devices suitable for using these systems include, for example, desktop and laptop computers, tablets, network appliances, mobile phones, personal digital assistants, e-book readers, televisions, and game consoles.

20 Claims, 5 Drawing Sheets

PROCESSING QUALITY-OF-SERVICE (QOS) INFORMATION OF MEMORY TRANSACTIONS

BACKGROUND

1. Field of the Invention

This disclosure is related to the field of computer systems, and more particularly to systems and methods for processing quality-of-service (QoS) information of memory transactions.

2. Description of the Related Art

Some computers feature memory access mechanisms that allow hardware subsystems or input/output (I/O) peripherals to access system memory without direct interference from a central processing unit (CPU) or processor. As a result, memory transactions or requests involving these peripherals may take place while the processor continues to perform other tasks, thus increasing overall system efficiency. Moreover, enabling a variety of circuits to access a common memory creates situations where the memory may have to make decisions as to the order in which received requests are processed, for example.

To allow the memory to make these types of decisions, a quality-of-service (QoS) mechanism may be implemented such that an entity generating a memory request may also provide information representing the QoS associated with that request. In a typical scenario, every circuit in the path of a memory request or transaction containing QoS information must be capable of processing that information—or at least of forwarding the information to a subsequent circuit which is then capable of processing it.

SUMMARY

This specification discloses systems and methods for processing quality-of-service (QoS) information of memory transactions. As such, systems and methods disclosed herein may be applied in various environments, including, for example, in computing devices that provide peripheral components with access to one or more memories. In some embodiments, systems and methods disclosed herein may be implemented in a system-on-a-chip (SoC) or application-specific integrated circuit (ASIC) such that several hardware and software components may be integrated within a single circuit. Examples of electronic devices suitable for using these systems and methods include, but are not limited to, desktop computers, laptop computers, tablets, network appliances, mobile phones, personal digital assistants (PDAs), e-book readers, televisions, video game consoles, etc.

In some embodiments, a system and method may include a logic circuit receiving identification information and QoS information corresponding to an original memory transaction transmitted from a hardware subsystem (e.g., a peripheral device, etc.) to a memory. This information may be received, for example, from a coherent interface circuit, or the like. In some embodiments, the interface circuit may extract the identification and QoS information from the memory transaction prior to forwarding it to a processor complex. In other embodiments, the interface may provide a copy of the memory transaction to the logic circuit so that the logic circuit may itself extract this information. Once obtained, the identification and QoS information may be stored, for example, in a buffer or the like.

The interface circuit may provide the original memory transaction to a processor complex so that the processor complex may perform any number of operations including, for example, cache coherency operations or the like. In some cases, the processor complex may not support QoS encoding, and some or all QoS information may be altered and/or lost during its processing. Thus, if the processor complex cannot satisfy the original memory transaction with its cache, for example, the processor complex may then forward that transaction to the memory—but the forwarded memory transaction may no longer encode its original QoS information.

Therefore, in some embodiments, upon exiting the processor complex and before reaching the memory, the forwarded memory transaction may be received by the logic circuit. The logic circuit may determine, based at least in part on previously stored identification information, whether this newly received memory transaction matches the original memory transaction. In response to the newly received memory transaction matching the original memory transaction, the logic circuit may then append the corresponding (and previously stored) QoS information to the newly received memory transaction before transmitting it to the memory.

Accordingly, a logic circuit may effectively provide a bypass path that allows information (e.g., QoS information) to circumvent a circuit (e.g., a processor complex) that does not otherwise support (or properly processes) that type of information. Although described as QoS information in various implementations discussed herein, these techniques enable the bypassing of any other information (e.g., user-defined bits, etc.) around any type of circuit.

In some embodiments, a system-on-chip (SoC) may include a memory, a processor complex coupled to the memory, an interface circuit coupled to the processor complex, and a logic circuit coupled to interface circuit, to the processor complex, and to the memory. The logic circuit may be configured to receive, from the interface circuit, identification information and user-defined information (e.g., QoS bits, etc.) corresponding to a first transaction. The logic circuit may also be configured to receive, from the processor complex, a second transaction that includes identification information but does not include user-defined information. Additionally or alternatively, the second transaction may include an altered version of its original user-defined information. The logic circuit may be further configured to determine that the second transaction matches the first transaction and insert the original user-defined information corresponding to the first transaction into the second transaction before transmitting the second transaction to the memory.

In yet other embodiments, a logic circuit may include a first buffer configured to store QoS information corresponding to an original memory transaction and a second buffer configured to store a given memory transaction. The logic circuit may also include a QoS circuit coupled to the first and second buffer and that configured to determine whether the original memory transaction matches the given memory transaction based at least in part on a comparison between identification information of the original and given memory transactions. The QoS circuit may be further configured to add the stored QoS information to the given memory transaction in response to the given memory transaction matching the original memory transaction.

In some embodiments, the memory transaction leaving the processor complex may not match the original transaction for which a logic circuit has stored QoS information. For example, the memory transaction may have been originated within the processor complex, and therefore its identification information may not match any identification information previously stored in the logic circuit. Further, if the processor complex does not support QoS encoding, then this transaction may not have QoS information. In those cases, the logic circuit may optionally generate QoS information based, for example, on the type of memory transaction—and it may insert the generated QoS information into the transaction before transmitting it to the memory.

BRIEF DESCRIPTION OF THE DRAWINGS

The following detailed description makes reference to the accompanying drawings, which are now briefly described.

Figure 1:
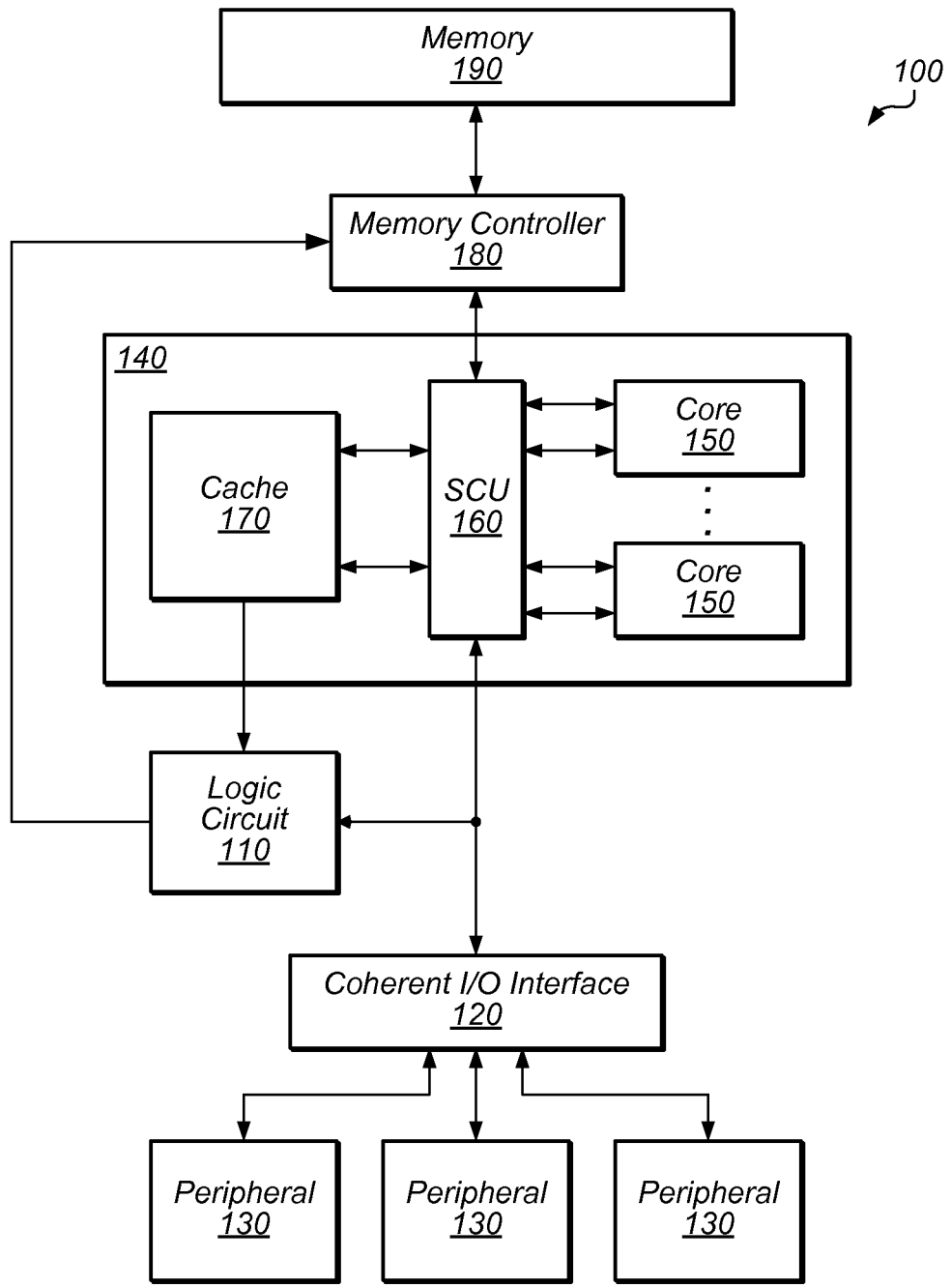
FIG. 1 is a block diagram of a SoC according to certain embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, ¶6 interpretation for that unit/circuit/component.

DETAILED DESCRIPTION OF EMBODIMENTS

In some embodiments, one or more processors may be placed within a processor fabric or complex. The processor complex may also include other components such as, for example, a coherency control circuit, which may enable hardware subsystems and/or peripherals to access a system memory while maintaining cache coherence. In operation, memory "requests" originating from a hardware subsystem or peripheral device may be processed, for example, by a coherent input/output (I/O) interface (CIF) of a central direct memory access (CDMA) controller, by a coherency bridge circuit, and/or by another suitable type of interface circuit. These requests may be transformed into memory "transactions," which may be sent by the CIF to the control circuit within the processor complex. Additionally or alternatively, memory requests may be transmitted from the CIF to the processor complex without modification. In any event, in some embodiments, one or more logic circuits may be configured to process memory requests or transactions communicated between the CIF and the processor complex.

Turning to FIG. 1, a block diagram of a System-on-Chip (SoC) is depicted according to certain embodiments. As illustrated, processor complex 140 includes cache memory and/or cache controller 170 (e.g., L2 cache) and a plurality of processor cores 150 coupled to control unit 160. In some embodiments, each of processor cores 150 may have its own cache (e.g., L1 cache). As shown in the illustrative implementation discussed below, examples of processor cores 150 may include ARM Holdings' Cortex™-A9 cores or the like, and examples of control unit 160 may include a Snoop Control Unit (SCU) or the like. In alternative implementations, however, other suitable components may be used. Control unit 160 may connect processor cores 150 to external memory controller 180 and/or cache 170. Memory controller 180 may be coupled to a shared, external, or any other type of memory 190 (e.g., RAM). Furthermore, control unit 160 may be configured to maintain data cache coherency among processor cores 150 and/or to manage accesses by external devices via its coherency port.

Still referring to FIG. 1, processor complex 140 is coupled to logic circuit 110, which in turn is coupled to coherent input/output (I/O) interface (CIF) 120. As illustrated, one or more peripherals 130 are coupled to CIF 120. In some embodiments, CIF 120 may be part of a central direct memory access (CDMA) controller or the like. Additionally or alternatively, CIF 120 may be a coherency bridge or any other suitable type of interface circuit that implements a memory access mechanism. Peripherals 130 may include any device configured to or capable of interacting with processor complex 140 and/or memory 190. Examples of peripherals 130 include audio controllers, video or graphics controllers, interface (e.g., universal serial bus or USB) controllers, etc.

In some embodiments any number and/or types of cores, caches, and control units may be used. Furthermore, a number of additional logic components (not shown) may be part of processor complex 140 such as, for example, controllers, buffers, clocks, synchronizers, logic matrices, decoders, interfaces, etc. In some cases, any number of peripherals, interfaces, logic circuits, processor complexes, memories and other elements may be discrete, separate components. In other cases, these and other elements may be integrated, for example, as system-on-chip (SoC), application-specific integrated circuit (ASIC), etc.

Components shown within SoC 100 may be coupled to each other using any suitable bus and/or interface mechanism. In some embodiments, these components may be connected using ARM Holdings' Advanced Microcontroller Bus Architecture (AMBA®) protocol or any other suitable on-chip interconnect specification for the connection and management of logic blocks. Examples of AMBA® buses and/or interfaces may include Advanced eXtensible Interface (AXI), Advanced High-performance Bus (AHB), Advanced System Bus (ASB), Advanced Peripheral Bus (APB), Advanced Trace Bus (ATB), etc.

In operation, peripherals 130 may have access to external memory 190 through logic circuit 110. For example, peripherals 130 may transmit memory access requests (e.g., read or write) to CIF 120, and CIF 120 may in response issue those requests or corresponding memory transactions to control unit 160 of processor complex 140. In some embodiments, CIF 120 may also provide memory requests or transactions to logic circuit 110. Additionally or alternatively, CIF 120 may examine memory access requests, extract information (such as, for example, memory address information, identification information, and/or QoS information) from these requests, and provide the extracted information to logic circuit 110. Furthermore, after being processed by processor complex 140, memory transactions may be forwarded by cache and/or a cache controller 170 to logic circuit 110. A detailed explanation of these mechanisms is provided below with respect to FIGS. 3 and 4.

In some embodiments, logic circuit 110 may be a programmable logic circuit or the like. As such, logic circuit 110 may comprise standard electronic components such as bipolar junction transistors (BJTs), field-effect transistors (FETs), other types of transistors, logic gates, operational amplifiers (op amps), flip-flops, capacitors, diodes, resistors, and the like. These and other components may be arranged in a variety of ways and configured to perform the various operations described herein.

Figure 2:
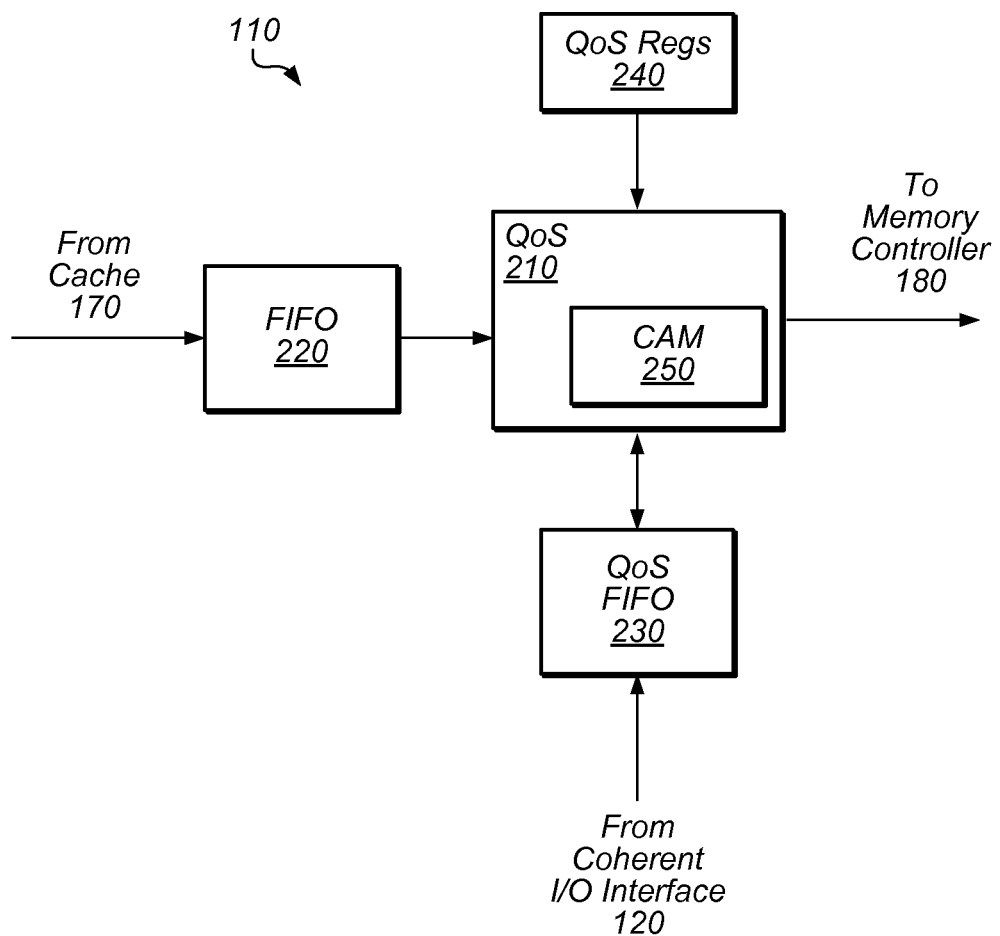
FIG. 2 is a block diagram of a logic circuit according to certain embodiments.

FIG. 2 shows a block diagram of logic circuit 110 according to certain embodiments. In some embodiments various components shown in FIG. 2 may operate within different frequency and/or voltage domains (e.g., $V_{dd}$ SoC and $V_{dd}$ CPU), although this is not a requirement. As illustrated, logic circuit 110 is coupled to memory controller 180, cache or cache controller 170, and CIF 120 (as also shown in FIG. 1).

Specifically, logic circuit 110 comprises QoS first-in-first-out (FIFO) buffer ("QoS buffer") 230 configured to receive memory transaction information from CIF 120. As noted above, in some implementations, QoS buffer 230 may be configured to store a copy of a memory transaction. In other implementations, QoS buffer 230 may be configured to store elements of memory transactions that are extracted or otherwise selected by CIF 120. Meanwhile, FIFO buffer 220 receives processed memory transactions from cache or cache controller 170. In some cases, various components shown in FIG. 2 may operate within different voltage domains (e.g., $V_{dd}$ SoC and $V_{dd}$ CPU). Accordingly, in these cases, FIFO buffer 220 and/or QoS buffer 230 may be implemented as asynchronous FIFOs.

In some embodiments, at least some of the information received from cache or cache controller 170 that corresponds to a given memory transaction received from CIF 120 may have been altered or otherwise overwritten in that transaction. Accordingly, in some embodiments, QoS circuit 210 may "correct" the missing or altered information in the memory transaction before forwarding it to memory controller 180. Moreover, QoS circuit 210 may include content-addressable memory (CAM) buffer 250 or the like configured to enable a transaction matching operation as described in more detail below.

As an illustrative example, consider a situation where peripheral 130 generates a particular memory request with a specified QoS designation. Examples of QoS designations may include a priority level, latency, memory bandwidth requirement, etc. Upon receipt of the memory request, CIF 120 may generate or otherwise send to processor complex 140 an "original memory transaction" corresponding to the received memory request. If CIF 120 supports QoS encoding, then this original memory transaction will include QoS information reflecting the QoS designation. CIF 120 may then forward the QoS information along with a memory transaction identification to QoS buffer 230 of logic circuit 110. Alternatively, CIF 120 may forward the entire memory transaction to QoS buffer 230. In either scenario, CIF 120 then forwards the original memory transaction to processor complex 140 so that it may perform one or more operations (e.g., perform a coherency check, etc.).

In cases where processor complex 140 does not support QoS encoding, for example, the bits of original memory transaction containing QoS information may be at least partially lost, modified or overwritten during processing. Additionally or alternatively, even when processor complex 140 normally supports QoS encoding, there may be cases where a "bug" prevents it from properly processing certain QoS information. In either case, when processor complex 140 forwards such "processed memory transaction" to memory controller 180 (e.g., when the transaction cannot be satisfied with the contents of cache 170), that transaction may not contain its original QoS information.

In some embodiments, QoS circuit 210 may determine, based at least in part on previously stored identification information, whether this processed memory transaction matches an original memory transaction. For example, QoS circuit 210 may determine whether the identification and/or memory address of the processed transaction has been previously received and stored in CAM 250. In response to the newly received transaction matching the original transaction, QoS circuit 210 may then append the corresponding QoS information to the processed memory transaction before transmitting it to memory controller 180.

Accordingly, logic circuit 110 may effectively provide a bypass path that allows information (e.g., QoS information) to circumvent a circuit (e.g., processor complex 140) that does not otherwise support (or properly processes) that type of information. Although described as QoS information in various implementations discussed herein, these techniques enable the bypassing of any other information (e.g., user-defined bits, etc.) around any type of circuit.

Still referring to FIG. 2, as an optional feature, logic circuit 110 may include one or more programmable registers in QoS Regs 240 that enable a user to activate "QoS bypass" functionality. For example, should QoS Regs 240 indicate that QoS bypass is not to be performed (e.g., because memory controller 180 also does not support QoS encoding), then QoS circuit 210 may simply forward memory transactions received from cache 170 to memory controller 180 without further processing. In some embodiments, QoS Regs 240 may also indicate which bits of a memory transaction are to be replaced or modified by logic circuit 110.

Additionally or alternatively, QoS circuit 210 may receive memory transactions from cache 170 that were originated by processor complex 140 and/or by another entity that does not support QoS encoding. In those cases, QoS 210 may add QoS information to such transactions based on a set or rules and/or a look-up table that correlates a type of transaction with a given QoS designation. The type of transaction may be determined, for example, from transaction identification information or the like. Furthermore, one or more bits within QoS Regs 240 may also enable a user to activate "QoS generation" functionality.

Figure 3:
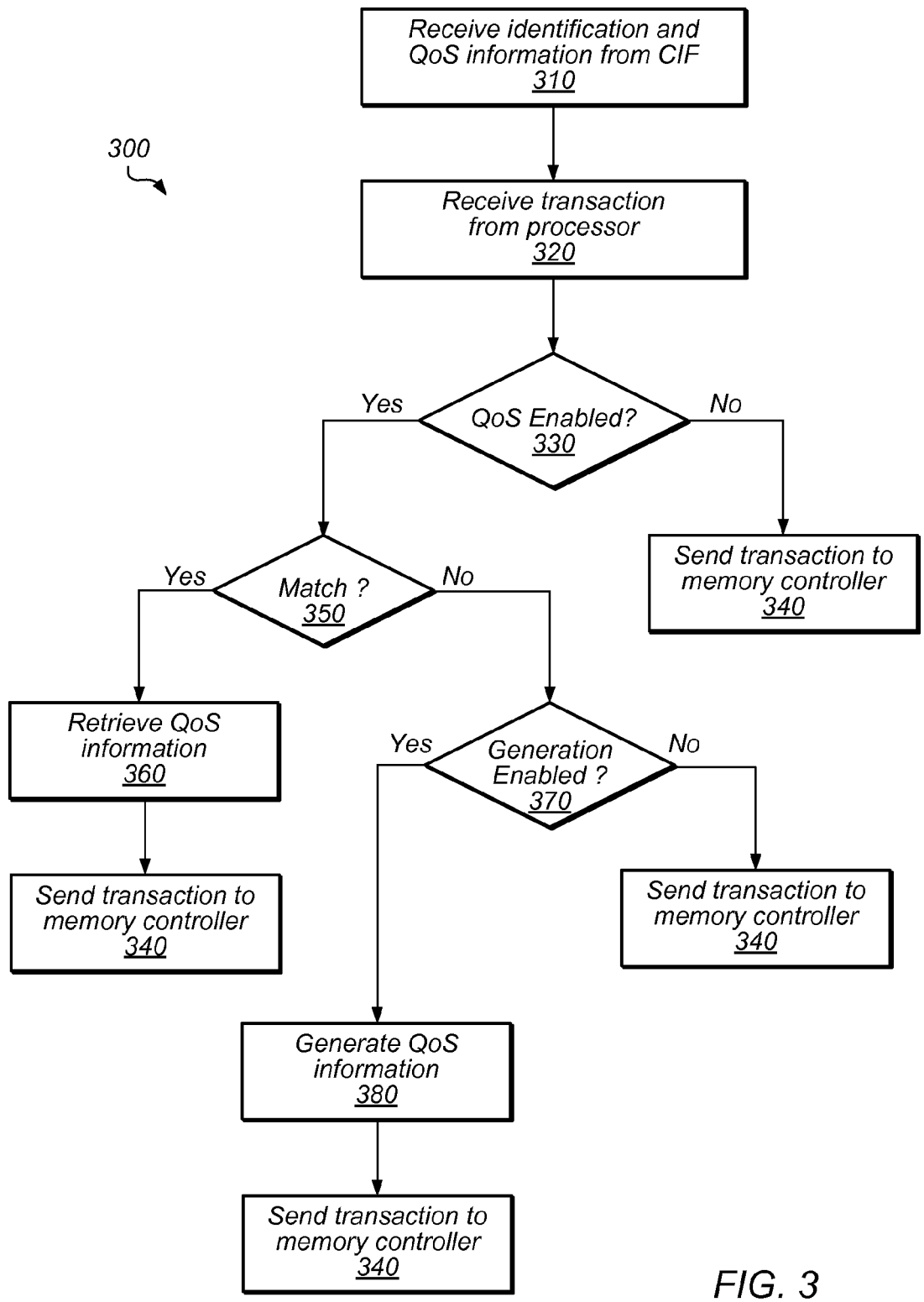
FIG. 3 is a flowchart of a method for processing memory transactions according to certain embodiments.

Referring to FIG. 3, a flowchart of a method for processing memory transactions is depicted according to certain embodiments. In some embodiments, method 300 may describe operations performed by logic circuit 110 of FIG. 2 when receiving memory transactions from CIF 120 and/or processor complex 140. Thus, at 310, method 300 may include receiving identification, memory address, and/or QoS information from an interface circuit (e.g., CIF 120) or the like. Then, at 320, method 300 may include receiving a transaction from processor complex 140 or another circuit that does not support QoS encoding. The received memory transaction may be stored, for example, in a buffer (e.g., FIFO buffer 220) or the like.

At 330, if a QoS bypass feature is not enabled (e.g., specified bits of QoS Reg 240 are not set) then method 300 may forward the memory transaction to a memory controller (e.g., memory controller 180) or the like without modification. On the other hand, if at 330 the QoS bypass feature is enabled, then method 300 may determine at 350 whether the identification information of the received memory transaction matches identification information stored in another buffer (e.g., QoS buffer 230). If the identification information is a match, then method 300 may retrieve the stored QoS information at 360 and attach, append, or otherwise add that information to the received memory transaction before sending it to memory controller 180 at 340. Should the identification information of the received not match what is stored in FIFO buffer 220, then method 300 may determine whether a QoS generation feature is enabled.

If the QoS generation feature is disabled, then method 300 may forward the transaction to memory controller 340 without modification. On the other hand, if QoS generation is enabled, then method 300 may generate QoS information at 480 and insert that information into the received memory transaction before sending it to memory controller 180 at 340.

An Illustrative Implementation

This section discusses an illustrative, non-limiting implementation of systems and methods described herein. This implementation includes one or more of ARM Holdings' Cortex™-A9 processors (as processor cores 150 in FIG. 1) and an SCU (control unit 160) that do not support QoS processing or encoding. Specifically, even though the ACP port (coherency port 160) of the SCU has USER bit inputs, in some revisions of the chip these USER bits do not make it out of processor complex 140. USER bits are ordinarily defined by a user, and may thus contain any type of information. In this particular case, USER bits contain QoS information. As such, logic circuit 110 may be employed to receive USER bits (i.e., QoS information) of transactions coming out of CIF 120 and append those bits to transactions leaving processor complex 140 before they arrive at memory controller 180, thereby allowing QoS information to bypass processor complex 140. In addition, logic circuit 110 may also be used to generate QoS information for transactions issued by processor cores 150.

Figure 4:
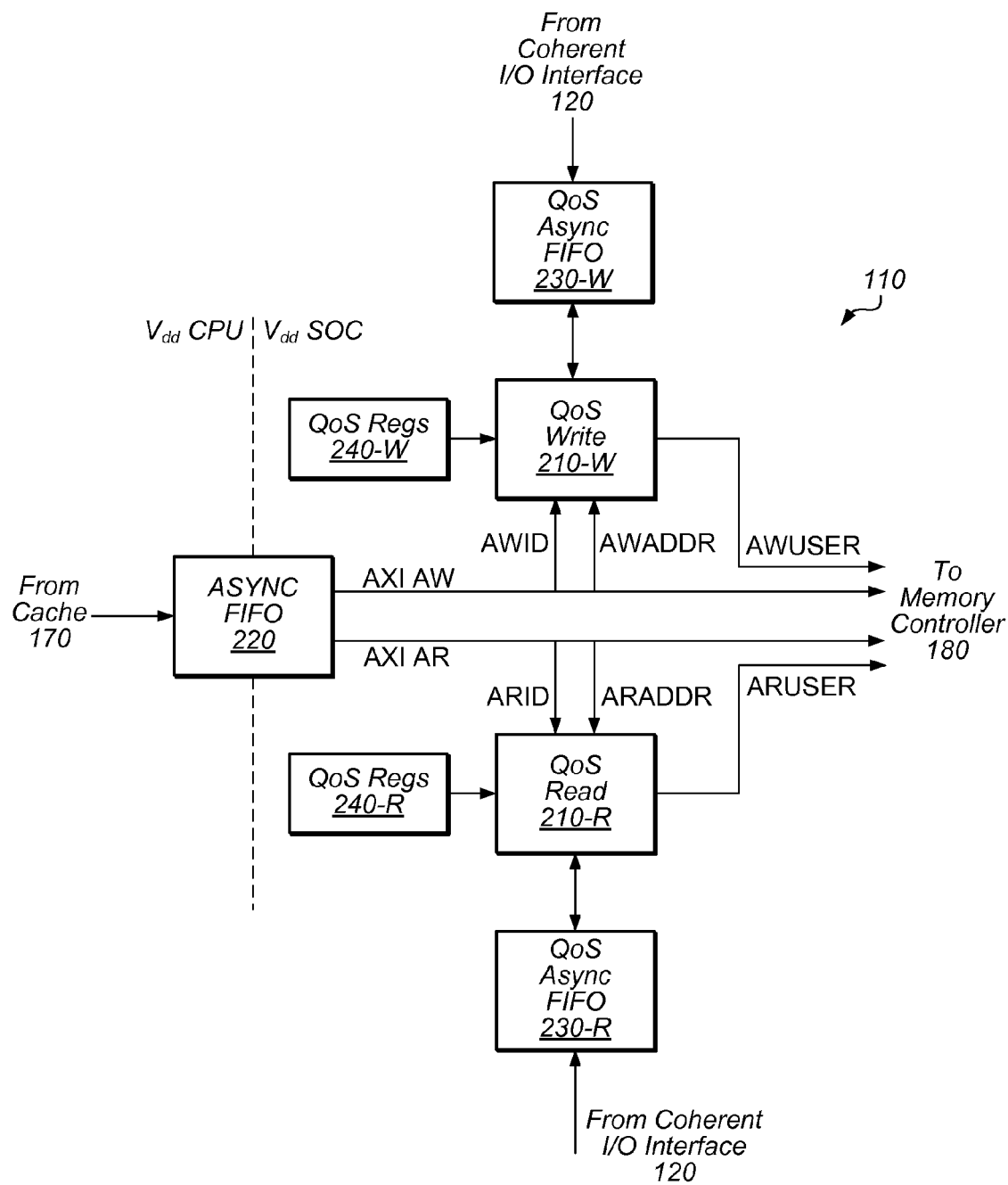
FIG. 4 is a block diagram of an illustrative, non-limiting implementation of systems and methods described herein according to certain embodiments.

FIG. 4 shows a block diagram of this illustrative, non-limiting implementation according to certain embodiments. This diagram is similar to that shown in FIG. 2, but illustrates an implementation of logic circuit 110 using an AMBA® AXI bus. (As noted above, other buses and/or interfaces may be used.) As depicted, circuit 110 includes two bus lines or address channels—write (AXI AW) and read (AXI AR). Hence, the blocks shown in FIG. 2 are duplicated—i.e., two QoS circuits 210-W and 210-R, two QoS Async FIFOs 230-W and 230-R, and two QoS Regs 240-W and 240-R. As the diagram shows, QoS circuits 210-W and 210-R receive identification (AWID and ARID) and address (AWADDR and ARADDR) information from Async FIFO 220, and append QoS information (AWUSER and ARUSER, previously stored in QoS Async FIFOs 230-W and 230-R upon receipt from CIF 120) to the memory transaction prior to or while forwarding it to memory controller 180.

Two sets of programmable QoS Regs 240-W and 240-R may be provided to enable a user to select various modes of operations for logic circuit 110 on an individual channel or channel-by-channel basis. For example, in some embodiments, a user may individually enable "QoS bypass" for a selected one (or both) of the write or read lines of the bus. Similarly, the user may individually enable "QoS generation" for a selected one of those lines. Further, each of QoS circuits 210-W and 210-R may include its own CAM buffer (not shown), as described with respect to FIG. 2 above. Although shown as separate blocks, alternative embodiments may combine two or more of the circuits depicted in FIG. 4.

In this implementation, USER bits (i.e., QoS information) and ADDR[31:5] (i.e., memory address information) bits may be written to buffer 230 according to transaction ID (i.e., identification information) and read back if that transaction makes it out on the master port going into memory controller 180, for example, using a content-addressable memory (CAM) respect to ADDR bits leaving memory controller 180. If the transaction produces a hit in cache, which may include an ARM PL310 cache controller (e.g., controller 170) or the like, then that transaction does not come out on the memory controller 180 port of processor complex 140. In this case, QoS data in logic circuit 110 is not used and may be overwritten after a specified length of time. Logic circuit 110 may also append USER bits to transactions originated by processor complex 140.

Also in this implementation, two lower bits of transaction ID may be used to determine a transaction type. A 4-bit register (PL310QosReg) may be used to determine QoS based on the lower 2-bits of ID out of the PL310 (i.e., cache controller 170). Since in this case the L2 cache does not generate QoS information, these bits are active. For example, if the bit is set to "0," the traffic corresponding to the same transaction ID may be marked as "best effort." Otherwise, if the bit is "1," traffic corresponding to the same transaction ID may be marked as "low latency." In some embodiments, an additional bit of PL310QosReg may be used to distinguish the QoS value between "prefetch" and regular "linefill" requests for individualized processing.

In the case where additional AxID information (e.g., AWID or ARID) is present, ID values from the CPU and ACP port may be used to distinguish additional transaction types. This may occur, for example, when "AxID[1:0]==2'b00 or 2'b10." An 8-bit register (CpuQosReg) may be used to distinguish transactions types from the CPU. If the register is "0," then "best effort" may be used. Meanwhile, "1" implies that "low latency" QoS setting is used. The encodings of different IDs from the CPU may be as follows:

TABLE I

| ID encoding | Read transaction type | Write transaction type |
| --- | --- | --- |
| 3'b000 | Non-cacheable | Non-cacheable |
| 3'b001 | n/a | n/a |
| 3'b010 | Data linefill—buffer 0 | Eviction |
| 3'b011 | Data linefill—buffer 1 | Eviction |
| 3'b100 | Instruction linefull | Eviction |
| 3'b101 | Instruction linefull | Eviction |
| 3'b110 | Instruction linefull | n/a |
| 3'b111 | Instruction linefull | n/a |

In this illustrative implementation, ACP-based QoS is propagated based upon a combination of matching request address out of A9 (e.g., processor complex 140), with a sideband address and QoS value stored in 8-entry CAM buffers (AcpQosBuf) within each of QoS circuits 210-W and 210-R shown in FIG. 4. In operation, the AcpQosBuf buffers may track newly allocated ACP addresses and associated QoS values by sending AxID (e.g., transaction identification information) and/or AxADDR[31:5] (e.g., memory address information) and AxUSER (e.g., QoS information) associated with the transaction to a PL310 DRAM interface as a transaction is output from CIF 120. Then, cache aligned address (AxADDR[31:5]) and QoS information may be stored into a CAM[AxID] location (note that AxID belongs to [0:7]). If a "QoS bypass" (ACPQoSEn) feature is set, when a transaction is available on the PL310 DRAM interface, the implementation may compare outgoing cache aligned address with address stored in the 8 entry CAM. The output of the CAM may be the 4-bit QoS value associated with the ACP address. Also, the implementation may use the first match to set the AxUSER (e.g., QoS information) for the transaction.

A Computer System and Storage Medium

Figure 5:
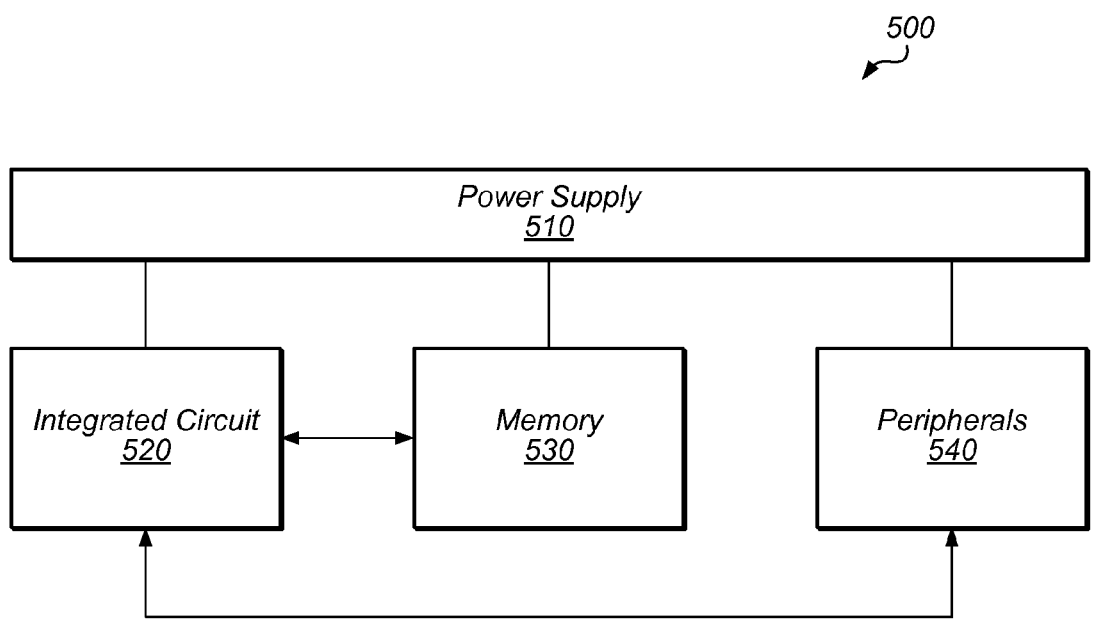
FIG. 5 is a block diagram of a computer system according to certain embodiments.

In some embodiments, a computer and accessible storage medium may incorporate embodiments of the systems and methods described herein. Turning next to FIG. 5, a block diagram of such system is shown. As illustrated, system 500 includes at least one instance of integrated circuit 520. Integrated circuit 520 may include one or more instances of processor cores 150 (from FIG. 1), processor complex 140, and/or a combination of processor complex 140 with other logic circuitry (e.g., logic circuit 110, CIF 120, peripherals 130, etc.). In some embodiments, integrated circuit 520 may be a System-on-Chip (SoC) including one or more instances of processor complex 140 and various other circuitry such as a memory controller, video and/or audio processing circuitry, on-chip peripherals and/or peripheral interfaces to couple to off-chip peripherals, etc. Integrated circuit 520 is coupled to one or more peripherals 540 (e.g., peripherals 130 in FIG. 1) and external memory 530 (e.g., memory 190 and/or memory controller 180). Power supply 510 is also provided which supplies the supply voltages to integrated circuit 520 as well as one or more supply voltages to memory 530 and/or peripherals 540. In some embodiments, more than one instance of the integrated circuit 520 may be included (and more than one external memory 530 may be included as well).

Peripherals 540 may include any desired circuitry, depending on the type of system 500. For example, in an embodiment, system 500 may be a mobile device (e.g., personal digital assistant (PDA), smart phone, etc.) and peripherals 540 may include devices for various types of wireless communication, such as wi-fi, Bluetooth, cellular, global positioning system, etc. Peripherals 540 may also include additional storage, including RAM storage, solid state storage, or disk storage. Peripherals 540 may include user interface devices such as a display screen, including touch display screens or multitouch display screens, keyboard or other input devices, microphones, speakers, etc. In other embodiments, system 500 may be any type of computing system (e.g., desktop and laptop computers, tablets, network appliances, mobile phones, personal digital assistants, e-book readers, televisions, and game consoles).

External memory 530 may include any type of memory. For example, external memory 530 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, RAMBUS DRAM, etc. External memory 530 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

The invention claimed is:

1. A method comprising:
receiving identification information and quality-of-service information corresponding to a first memory transaction transmitted from a hardware subsystem to a memory;
storing the identification information and the quality-of-service information;
receiving a given memory transaction from a processor complex, wherein the processor complex does not support quality-of-service encoding;
determining, based at least in part on the stored identification information, whether the given memory transaction matches the first memory transaction; and
in response to the given memory transaction matching the first memory transaction, appending the stored quality-of-service information to the given memory transaction.

2. The method of claim 1, further comprising transmitting the given memory transaction including the stored quality-of-service information to the memory.

3. The method of claim 1, wherein receiving the identification information and the quality-of-service information comprises receiving the first memory transaction.

4. The method of claim 1, further comprising:
receiving memory address information corresponding to the first memory transaction;
storing the received memory address information; and
determining, based at least in part on the stored memory address information, whether the given memory transaction matches the first memory transaction.

5. The method of claim 1, wherein the hardware subsystem, the coherent interface, and the memory each supports quality-of-service encodings.

6. The method of claim 1, further comprising, prior to determining whether the given memory transaction matches the first memory transaction, determining that a quality-of-service bypass operation is enabled.

7. The method of claim 1, further comprising:
in response to the given memory transaction not matching the first memory transaction, generating quality-of-service information based at least in part on the identification information of the given memory transaction; and
appending the generated quality-of-service information to the given memory transaction prior to transmitting the given memory transaction to the memory.

8. The method of claim 7, further comprising, prior to generating quality-of-service information, determining that a quality-of-service generation operation is enabled.

9. The method of claim 1, wherein appending the stored quality-of-service information to the given memory transaction comprises modifying a user-defined bit of the given memory transaction.

10. A system-on-chip (SoC) comprising:
a memory;
a processor complex coupled to the memory;
an interface circuit coupled to the processor complex, wherein the interface circuit is configured to provide a first transaction to the processor complex; and
a logic circuit coupled to interface circuit, to the processor complex, and to the memory, wherein the logic circuit is configured to:
receive, from the interface circuit, identification information and user-defined information corresponding to the first transaction;
receive, from the processor complex, a second transaction that includes identification information but does not include user-defined information;

determine, based at least in part upon a comparison between the identification information of the first and second transactions, whether the second transaction matches the first transaction;

in response to a determination that the second transaction matches the first transaction, insert the user-defined information corresponding to the first transaction into the second transaction; and transmit the second transaction to the memory.

11. The SoC of claim 10, wherein the transaction comprises a memory transaction.

12. The SoC of claim 11, wherein the user-defined information comprises quality-of-service information.

13. The SoC of claim 12, wherein the processor complex does not support quality-of-service encoding.

14. The SoC of claim 13, wherein the logic circuit is further configured to:

in response to the second transaction not matching the first transaction, generate quality-of-service information based at least in part on the identification information of the second transaction; and insert the generated quality-of-service information to the second transaction prior to transmitting the second transaction to the memory.

15. A logic circuit comprising:

a first buffer configured to store quality-of-service information corresponding to a first transaction;

a second buffer configured to store a given memory transaction; and a quality-of-service circuit coupled to the first and second buffer, wherein the quality-of-service circuit is configured to:

determine whether the first memory transaction matches the given memory transaction based at least in part on a comparison between identification information of the first and given memory transactions; and add the stored quality-of-service information to the given memory transaction in response to the given memory transaction matching the first memory transaction.

16. The logic circuit of claim 15, wherein the second buffer is configured to receive the given memory transaction from a circuit that does not support quality-of-service encoding.

17. The logic circuit of claim 15, wherein the identification information comprises address information.

18. The logic circuit of claim 15, further comprising a first programmable register coupled to the quality-of-service circuit, wherein the programmable register is configured to enable a quality-of-service bypass operation for an individual line of a bus coupling the second buffer to a memory controller.

19. The logic circuit of claim 15, wherein the quality-of-service circuit is further configured to:

in response to the given memory transaction not matching the first memory transaction, generate quality-of-service information based at least in part on identification information of the given memory transaction; and add the generated quality-of-service information to the given memory transaction.

20. The logic circuit of claim 19, further comprising a second programmable register coupled to the quality-of-service circuit, wherein the second programmable register is configured to enable a quality-of-service generation operation for an individual line of a bus coupling the second buffer to a memory controller.

\* \* \* \* \*